US012790454B2

(12) United States Patent
Park et al.

(10) Patent No.: US 12,790,454 B2
(45) Date of Patent: Nov. 10, 2026

(54) VARIABLE TRANSMITTANCE LAMINATE WITH EMBEDDED THERMALLY CONDUCTIVE MULTI-LAYER

(71) Applicant: GM GLOBAL TECHNOLOGY OPERATIONS LLC, Detroit, MI (US)

(72) Inventors: Jonglee Park, Novi, MI (US); Julien P. Mourou, Bloomfield Hills, MI (US); Yujie Guo, Thornhill (CA); Bradley Allen Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/462,769

(22) Filed: Sep. 7, 2023

(65) Prior Publication Data

US 2025/0084227 A1 Mar. 13, 2025

(51) Int. Cl.
*C08J 7/044* (2020.01)
*C08J 7/04* (2020.01)
*C08J 7/054* (2020.01)

(52) U.S. Cl.
CPC ............... *C08J 7/044* (2020.01); *C08J 7/042* (2013.01); *C08J 7/054* (2020.01); *C08J 2300/22* (2013.01); *C08J 2300/24* (2013.01)

(58) Field of Classification Search
CPC ... C08J 7/044; C08J 7/042; C08J 7/054; C08J 2300/22; C08J 2300/24; G02B 26/02;
(Continued)

(56) References Cited

U.S. PATENT DOCUMENTS 10,627,070 B2 4/2020 Robinson
2006/0250809 A1* 11/2006 Strazzanti ............ F21S 41/645 362/538

(Continued)

FOREIGN PATENT DOCUMENTS

DE 202018102188 U1 5/2018
WO 2016009589 A1 1/2016

(Continued)

OTHER PUBLICATIONS

DE Office Action for Appln No. 10 2023 130 570.0 dated Apr. 22, 2024, 4 pages.

*Primary Examiner* — Brian Handville
(74) *Attorney, Agent, or Firm* — CANTOR COLBURN LLP

(57) ABSTRACT

Aspects of the disclosure include variable transmittance laminates having an embedded thermally conductive multi-layer for auto-shading applications. An exemplary vehicle includes a lighting system having a light source and a housing for the light source. A variable transmittance laminate is positioned such that light emitted from the housing passes through the variable transmittance laminate. The variable transmittance laminate includes a thermally conductive multi-layer and an auto-shading film on the thermally conductive multi-layer. The auto-shading film includes discrete substructures which vary in alignment in response to an electric field. A wire is embedded in the auto-shading film and a controller is electrically coupled to the wire. The controller switchably causes the wire to deliver the electric field to the discrete substructures. The variable transmittance laminate has a first transmittance when a switch is in a first state and a second transmittance when the switch in in a second state.

20 Claims, 6 Drawing Sheets

(58) Field of Classification Search
CPC .... G02F 2202/022; G02F 1/1334; G02F 1/15; G02F 1/31; B60J 3/04; E06B 3/6722; E06B 9/24; F21S 41/141; F21S 41/151; F21S 41/285; F21S 43/14; F21S 43/15; F21S 43/28131; F21S 43/601; F21S 41/645; F21S 45/48; F21V 14/006; F21V 23/04; F21W 2107/10
See application file for complete search history.

(56) References Cited

U.S. PATENT DOCUMENTS

| | | | | |
|---|---|---|---|---|
| 2009/0154180 | A1 * | 6/2009 | Cho | F21V 29/75<br>362/459 |
| 2014/0328078 | A1 * | 11/2014 | Williams | F21S 41/50<br>362/512 |
| 2018/0023778 | A1 * | 1/2018 | Gordon | B60Q 1/02<br>362/547 |
| 2018/0187865 | A1 * | 7/2018 | Wehlus | F21S 41/176 |
| 2018/0277780 | A1 * | 9/2018 | Endo | C08L 57/00 |
| 2023/0350240 | A1 * | 11/2023 | Miller | G02F 1/137 |

FOREIGN PATENT DOCUMENTS

| | | | | |
|---|---|---|---|---|
| WO | WO-2020232544 | A1 * | 11/2020 | F21S 41/635 |
| WO | WO-2021229562 | A2 * | 11/2021 | G02F 1/13306 |

* cited by examiner

VARIABLE TRANSMITTANCE LAMINATE WITH EMBEDDED THERMALLY CONDUCTIVE MULTI-LAYER

INTRODUCTION

The subject disclosure relates to lighting technologies, and particularly to a variable transmittance laminate having an embedded thermally conductive multi-layer for auto-shading applications.

Variable transmittance glass laminates, also known as auto-dimming or self-dimming glass panels, are advanced glass laminates that can dynamically adjust their level of transparency in response to a range of external factors, such as light intensity, temperature, and/or user preferences. By modulating the degree of transparency, variable transmittance glass panels can adjust the level of shading (e.g., auto-dimming) provided by the panel as desired. Variable transmittance glass panels have been applied to a range of applications across various industries, including automotive, architectural, and aerospace industries. These types of panels are particularly useful in applications such as windows, sunroofs, skylights, and architectural facades, where the amount of light and heat entering a space needs to be regulated for comfort, energy efficiency, and privacy.

SUMMARY

In one exemplary embodiment a vehicle includes a lighting system having a light source and a housing for the light source. A variable transmittance laminate is positioned such that light emitted from the housing passes through the variable transmittance laminate. The variable transmittance laminate includes a thermally conductive multi-layer and an auto-shading film on the thermally conductive multi-layer. The auto-shading film includes discrete substructures which vary in alignment in response to an electric field. A wire is embedded in the auto-shading film and a controller is electrically coupled to the wire. The controller switchably causes the wire to deliver the electric field to the discrete substructures. The variable transmittance laminate has a first transmittance when a switch is in a first state and a second transmittance when the switch in in a second state.

In addition to one or more of the features described herein, in some embodiments, a structural composite is embedded within the thermally conductive multi-layer.

In some embodiments, a moisture barrier coating layer is formed between the auto-shading film and the thermally conductive multi-layer.

In some embodiments, the thermally conductive multi-layer includes a thermal conductive layer. The thermal conductive layer includes a material that shifts a peak temperature during an overmolding process for forming the variable transmittance laminate out of the auto-shading film.

In some embodiments, the thermal conductive layer includes at least one of a graphene layer, a single layer hexagonal boron nitride, aluminum oxide, sapphire, indium tin oxide, carbon black, and metal foil.

In some embodiments, the thermally conductive multi-layer further includes a first interphase polymer layer, a polymer layer, and a second interphase polymer layer. In some embodiments, the first interphase polymer layer includes a first polymer and a second polymer. The first polymer includes a same material as at least one of the inner lens layer and the outer lens layer. The second polymer includes a same material as the polymer layer.

In another exemplary embodiment a variable transmittance laminate can include a thermally conductive multi-layer and an auto-shading film on the thermally conductive multi-layer. The auto-shading film includes discrete substructures which vary in alignment in response to an electric field. The variable transmittance laminate further includes an outer lens layer and an inner lens layer.

In yet another exemplary embodiment a method can include forming a thermally conductive multi-layer and forming an auto-shading film on the thermally conductive multi-layer. The auto-shading film includes discrete substructures which vary in alignment in response to an electric field. The method includes forming an outer lens layer and forming an inner lens layer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
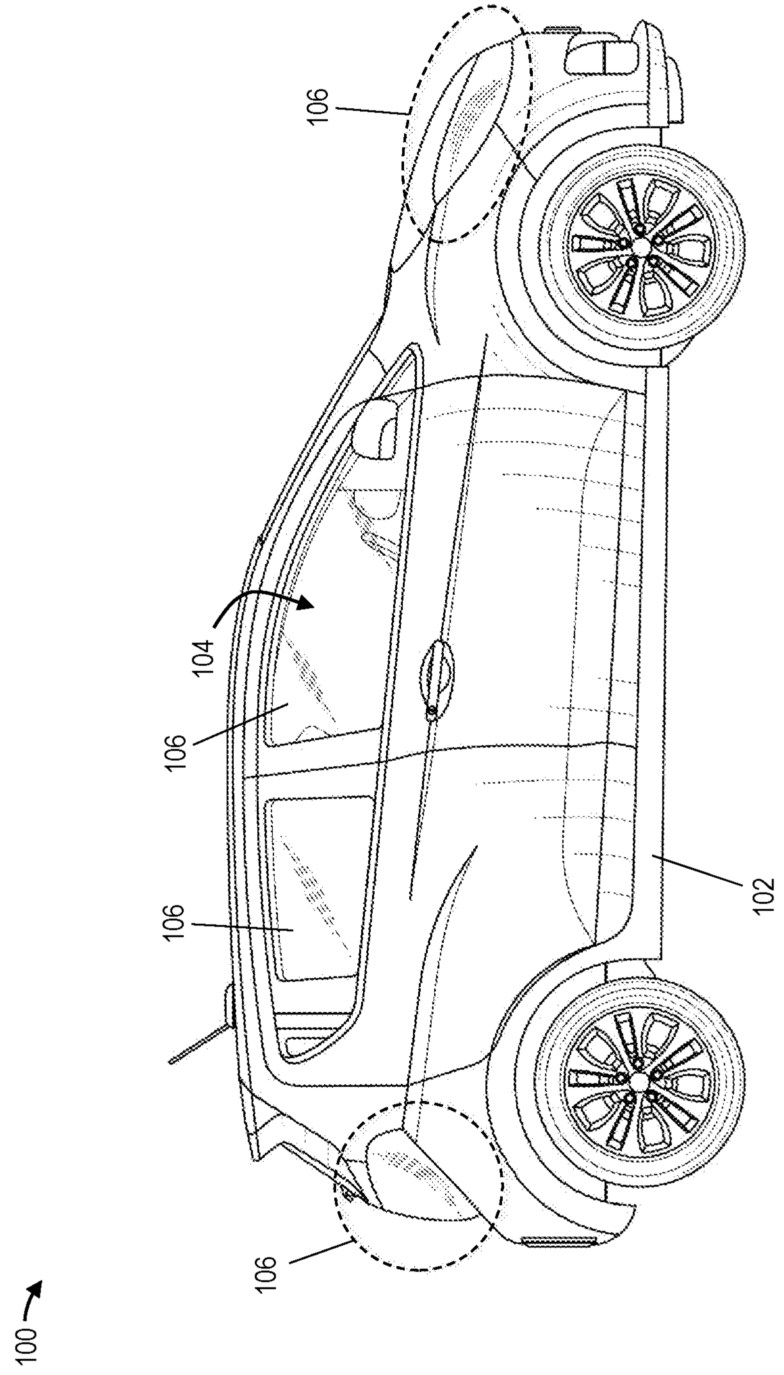
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Lighting systems play a pivotal role in enhancing the aesthetics, functionality, and ambiance of spaces across various domains, ranging from architecture and interior design to automotive and entertainment industries. Central to these systems are light sources and lenses, which work in tandem to control and manipulate the distribution, intensity, direction, and quality of light. Light sources are the fundamental components that emit light energy, such as incandescent bulbs, fluorescent tubes, LEDs (light-emitting diodes), halogen lamps, etc. Each light source type offers different color temperatures, energy efficiency levels, and lifespans, allowing lighting systems to be tailored to the specific needs of a given application.

Lenses, in the context of lighting systems, are optical elements designed to modify the behavior of light emitted from the light source. Lenses can be made from various materials, such as glass or plastics, and can control factors such as the angle of light dispersion, beam width, and focus. Lenses can be used to direct light in a specific direction, diffuse it for even illumination, and/or create visually appealing effects by refracting or reflecting light. When integrated with a light source in a lighting system, a lens can produce a range of lighting effects, such as focusing light in a specific area or scattering it for a more diffuse illumination (directionality), determining how wide or narrow the light distribution will be (beam control), alter the color temperature or color rendering properties of the light (color and color temperature control), as well as various specialized visual effects, such as a lens flare, halo effects, and/or light patterns.

In short, lenses can be used in a variety of ways to modify the behavior of light emitted from a source. Among these possibilities is the integration of a low transmittance outer lens with a high-power light source. The primary idea behind this approach is to provide a lighting system that appears opaque or non-transmissive when not in use (i.e., when the light source is off), giving the lighting system a sleek, minimalist look that can blend in with surrounding materials, while still providing ample illumination through the outer lens when the lighting system is activated (i.e., when the light source is on).

The tradeoffs for these types of systems include a relatively high driving power and a natively low lighting efficiency. Observe, for example, that a taillight assembly having a low transmittance lens with a transmittance of 16 percent will only emit 16 units of light for every 100 units of light generated. Such assemblies can require high power light sources (e.g., high wattage LEDs, etc.) to meet photometric requirements—that is, to ensure enough illumination will pass through the low transmittance outer lens when lit.

Variable transmittance glass laminates (auto-dimming glass panels), in contrast to low transmittance lenses, are advanced glass laminates that can dynamically adjust their level of transparency in response to a range of external factors, such as when braking or activating a turn signal. Advantageously, a variable transmittance glass laminate can provide a low transmittance (e.g., 3, 5, 10, 15, 20, 30, 40, 50 percent transmittance) when unlit to emulate the appearance of an unlit low transmittance outer lens, while also providing a higher transmittance (e.g., 40, 50, 60, 70, 80, 90, 95, 98 percent transmittance) when lit to provide efficient illumination when the lighting system is activated. Unfortunately, variable transmittance glass laminates are notoriously difficult to manufacture. Some challenges in fabricating variable transmittance glass laminates include delamination and thermal degradation, often caused by the relatively high temperatures experienced during the molding process.

This disclosure introduces a variable transmittance laminate having an embedded thermally conductive multi-layer. In some embodiments, an auto-shading film (ASF) such as a polymer dispersed liquid crystal (PDLC) and/or electrochromic (EC) film is fixed between two thermally conductive multi-layers (TCMLs). The TCML-ASF-TCML stack is then placed into a mold with a lens material, such as a polycarbonate (PC) material and/or acrylic material such as poly(methyl methacrylate) (PMMA). A variable transmittance polymer laminate is then formed using injection compression and/or standard injection molding processes at temperatures sufficient to create a polymer melt (also referred to as an overmolding process). The embedded thermally conductive multi-layer mitigates delamination and thermal degradation effects caused during the high temperature molding process.

Lighting systems having variable transmittance laminates constructed in accordance with one or more embodiments offer several technical advantages over prior low transmittance and variable transmittance lenses. Notably, the embedded thermally conductive multi-layer can shift the peak temperatures out of the auto-shading film. Depending on construction, peak temperatures can be shifted into the thermally conductive multi-layers themselves or into the polymer melt, preventing thermal damage to the auto-shading film during the molding process. Other advantages are possible. For example, in some embodiments, a moisture barrier coating layer can be placed between the auto-shading film and the thermally conductive multi-layers to prevent and/or mitigate condensation within the laminate. In some embodiments, a structural composite can be added to the molding process to enhance overall mechanical performance for larger applications. By incorporating structural composites during the molding process, variable transmittance laminates can be incorporated within a wider range of applications, such as the roof glazing and A-pillar of a vehicle.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Body 102 also includes a number of glass or polymer laminate assemblies (also referred to as glass panels), such as, for example a windshield, driver and passenger windows, front headlights, taillights, a sunroof, etc.

In some embodiments, one or more of these laminate assemblies are variable transmittance laminates 106. The particular variable transmittance laminates 106 shown (here, the front and rear passenger windows, headlights, and taillights) are emphasized only for ease of illustration and discussion. It should be understood that any aspect of the present disclosure can be applied to any of the glass and polymer laminate assemblies in the vehicle 100, including, for example, the windshield, any of the driver and passenger doors (front and rear), the rear glass panel, a sunroof/moonroof, etc. In short, the location, size, arrangement, etc., of a variable transmittance laminate 106 is not meant to be particularly limited, and all such configurations are within the contemplated scope of this disclosure.

As will be detailed herein, the variable transmittance laminate 106 includes an auto-shading film fixed between two thermally conductive multi-layers. In some embodiments, the variable transmittance laminate 106 is coupled to a controller that dynamically adjusts the transmittance of the auto-shading film (refer to FIGS. 2A and 2B). In some embodiments, the thermally conductive multi-layers include a thermal conductive layer, a polymer layer, and interphase polymer layers (refer to FIG. 3). In some embodiments, the thermally conductive multi-layers shift a peak thermal load from the auto-shading film (refer to FIG. 4).

Figure 2B:
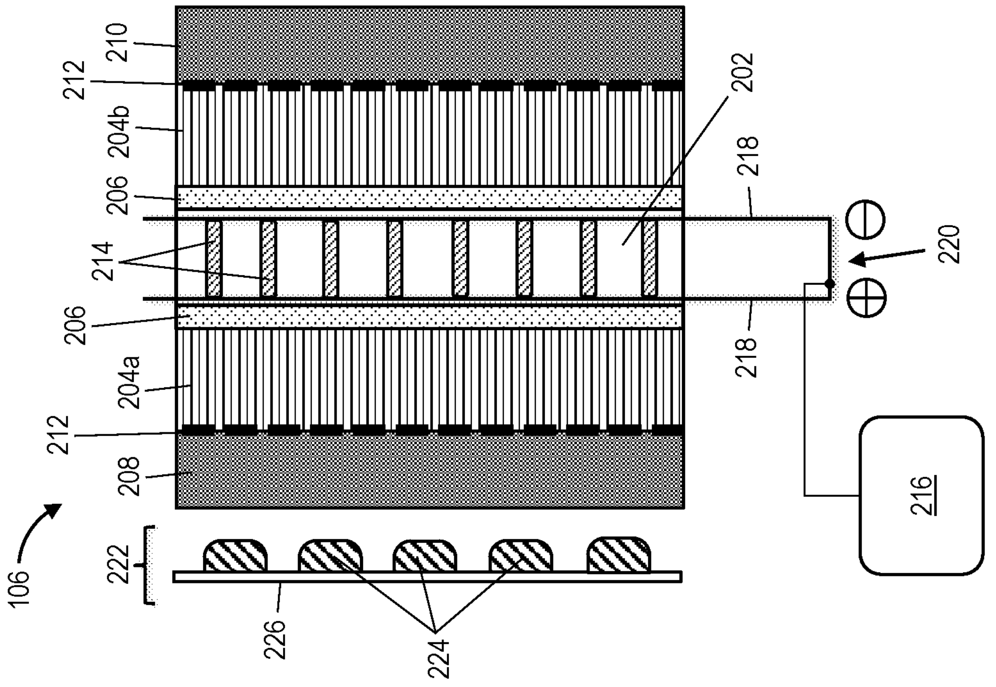
FIG. 2B is a cross-sectional view of the variable transmittance laminate shown in FIG. 1 in a relatively high transmittance state in accordance with one or more embodiments.
Figure 2A:
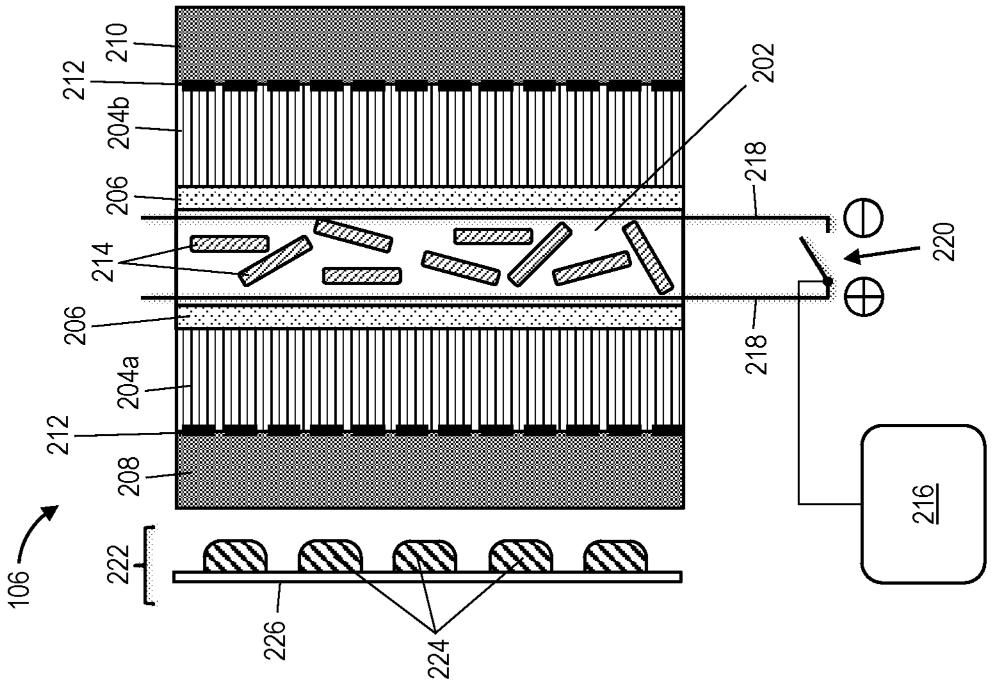
FIG. 2A is a cross-sectional view of the variable transmittance laminate shown in FIG. 1 in a relatively low transmittance state in accordance with one or more embodiments.

FIGS. 2A and 2B illustrate cross-sectional views of the variable transmittance laminate 106 shown in FIG. 1 at a relatively low transmittance state (refer to FIG. 2A) and a relatively high transmittance state (refer to FIG. 2B) in accordance with one or more embodiments. As shown in FIGS. 2A and 2B, the variable transmittance laminate 106 includes an auto-shading film 202 fixed between thermally conductive multi-layers 204*a* and 204*b*.

The auto-shading film 202 can be made of any suitable material known for providing a variable, controllable transmittance, such as, for example, a polymer dispersed liquid crystal (PDLC) film, an electrochromic (EC) film, and/or a tungsten oxide ($WO_3$) based film. Other auto-shading materials are possible and all such configurations are within the contemplated scope of this disclosure.

The thermally conductive multi-layers 204*a* and 204*b* can be made of the same, or different, layers. In some embodiments, the thermally conductive multi-layers 204*a* and 204*b* each include a thermal conductive layer. The thickness of the thermally conductive multi-layers 204*a* and 204*b* can vary as desired based on thermal threading performance. In some embodiments, the thickness of the thermally conductive multi-layers 204*a* and 204*b* is between 0.5 and 5.0 mm, although other thicknesses are within the contemplated scope of this disclosure. In some embodiments, the thermally conductive multi-layers 204*a* and 204*b* can be made of optically transparent or near transparent materials (transparency greater than 90 percent). In some embodiments, the thermally conductive multi-layers 204*a* and 204*b* are not transparent. For example, in some embodiments, the thermal conductive layer is made of a nontransparent material, such as, for example, carbon black and/or metal foil(s), and/or from relatively thicker layers which impede transparency. In some embodiments, the thermal conductive layer includes a graphene layer (k~3000 W/m-K), a single layer hexagonal boron nitride (h-BN) (k~550 W/m-K), aluminum oxide ($Al_2O_3$) (k~10 W/m-K), sapphire (k~1000 W/m-K), and/or indium tin oxide (k~2 W/m-K), although other materials are within the contemplated scope of this disclosure. The thermally conductive multi-layers 204*a* and 204*b* are discussed in greater detail with respect to FIG. 3.

In some embodiments, a moisture barrier coating layer 206 is positioned between the auto-shading film 202 and the thermally conductive multi-layers 204*a* and 204*b*. The moisture barrier coating layer 206 can prevent condensation inside the variable transmittance laminate 106 before, during, and after the molding process (refer to FIG. 3).

As further shown in FIGS. 2A and 2B, an inner lens layer 208 and an outer lens layer 210 are formed to cover opposite sides of the auto-shading film 202 and the thermally conductive multi-layers 204*a* and 204*b*. The inner lens layer 208 and the outer lens layer 210 can be made of a range of suitable transparent polymers for overmolding. For example, in some embodiments, the inner lens layer 208 and the outer lens layer 210 are made of benzoxazine, a bismaleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-transparent layers thereof, and combinations thereof. In certain aspects, the inner lens layer 208 and the outer lens layer 210 may be a thermoplastic transparent layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), Polyvinyl Chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), Styrene Methyl Methacrylate (SMMA), Methyl Methacrylate Acrylonitrile Butadiene Styrene (MABS), polycarbonate (PC), polyaryletherketone (PAEK), polyetherketoneketone (PEKK), co-transparent layers thereof, and combinations thereof.

In some embodiments, an optional structural composite 212 can be added to the molding process (refer to FIG. 3) to enhance overall mechanical performance. The structural composite 212 can include, for example, an embedded fiber composite. While the fiber composite is not meant to be particularly limited, the fiber composite can include, for example, fiber-reinforced polymers (FRP) made of carbon, glass, fiberglass, natural fibers like jute, hemp, or flax, and/or aramid (e.g., Kevlar) fibers embedded within a polymer matrix, typically epoxy or polyester, In some embodiments, the structural composite 212 is incorporated within the variable transmittance laminate 106 during the molding process. Reinforcing the variable transmittance laminate 106 in this manner allows for the variable transmittance laminate 106 to be leveraged in a variety of structural applications, such as the roof glazing and A-pillar of a vehicle.

In some embodiments, the auto-shading film 202 of the variable transmittance laminate 106 includes discrete molecules and/or substructures 214 which vary in alignment and/or in optical properties in response to an applied electric current. The substructures 214 and/or the auto-shading film 202 can be made of electrochromic and/or liquid crystal materials.

In some embodiments, the substructures 214 include electrochromic pigments and/or materials that change in color and/or opacity in response to an applied voltage. In some embodiments, the substructures 214 include electrochromic pigments that undergo reversible electrochemical reactions when an electric current is passed through them. Depending on the voltage applied, the substructures 214 (e.g., molecules) either absorb or reflect light, altering the transparency of the auto-shading film 202.

In some embodiments, the substructures 214 include liquid crystal molecules that can change their alignment and/or optical properties when subjected to an electric field. By applying a voltage, the orientation of the liquid crystal molecules can be controlled, allowing the auto-shading film 202 to transition between transparent and opaque states by changing the applied voltage (or current).

In some embodiments, the transmittance (or opacity) of the auto-shading film 202 is controlled using an external control mechanism which includes a controller 216, wires 218, and a switch 220. In some embodiments, the controller 216 is configured to direct (or withhold) a switching current to (from) the switch 220. While not meant to be particularly limited, in some embodiments, the controller 216 can include, for example, an Electronic Control Unit (ECU) of the vehicle 100.

In some embodiments, the wires 218 are embedded within the auto-shading film 202 so that closing the switch 220 results in the application of a driving current to the substructures 214. The driving current can be provided via the controller 216 and/or via an external power source (not separately shown). In some embodiments, opening the switch 220 results in the substructures 214 being positioned in a random state, while closing the switch 220 results in the substructure 214 being aligned to the resultant electric field.

In some embodiments, positioning the substructures 214 randomly results in a low transmittance state, as light from a light source 222 will be wholly or partially deflected, absorbed, and reflected from the substructures 214. In some embodiments, aligning the substructures 214 with an applied electric field results in a high transmittance state, as light from a light source 222 will be free to pass between the substructures 214 and across the auto-shading film 202. FIG. 2A depicts the auto-shading film 202 and switch 220 in an open, low transmittance state, while FIG. 2B depicts the auto-shading film 202 and switch 220 in a closed, high transmittance state.

The light source 222 can be made of any suitable materials, such as, for example, incandescent bulbs, fluorescent tubes, LEDs (light-emitting diodes), halogen lamps, etc. In some embodiments, the light source 222 includes an array of LEDs 224 arranged on a substrate 226. The substrate 226 can include, for example, a backplane, although other configurations are within the contemplated scope of this disclosure.

While not meant to be particularly limited, configuring the auto-shading film 202 in this manner allows for the variable transmittance laminate 106 to be leveraged within a variety of lighting applications. For example, during normal driving conditions, a tail light lens including the variable transmittance laminate 106 can be set to maximum opacity (i.e., minimum transmittance) by controlling the switch 220. In this state the tail light lens visually blends into the surrounding materials to create a seamless look. On the other hand, when a light source (e.g., light source 222) is needed, such as when braking or activating a turn signal, the switch 220 can be closed to transition the auto-shading film 202 to a maximum transmittance state to allow as much light as possible to exit the variable transmittance laminate 106, enabling efficient emission of bright light to surrounding drivers and pedestrians.

Figure 3:
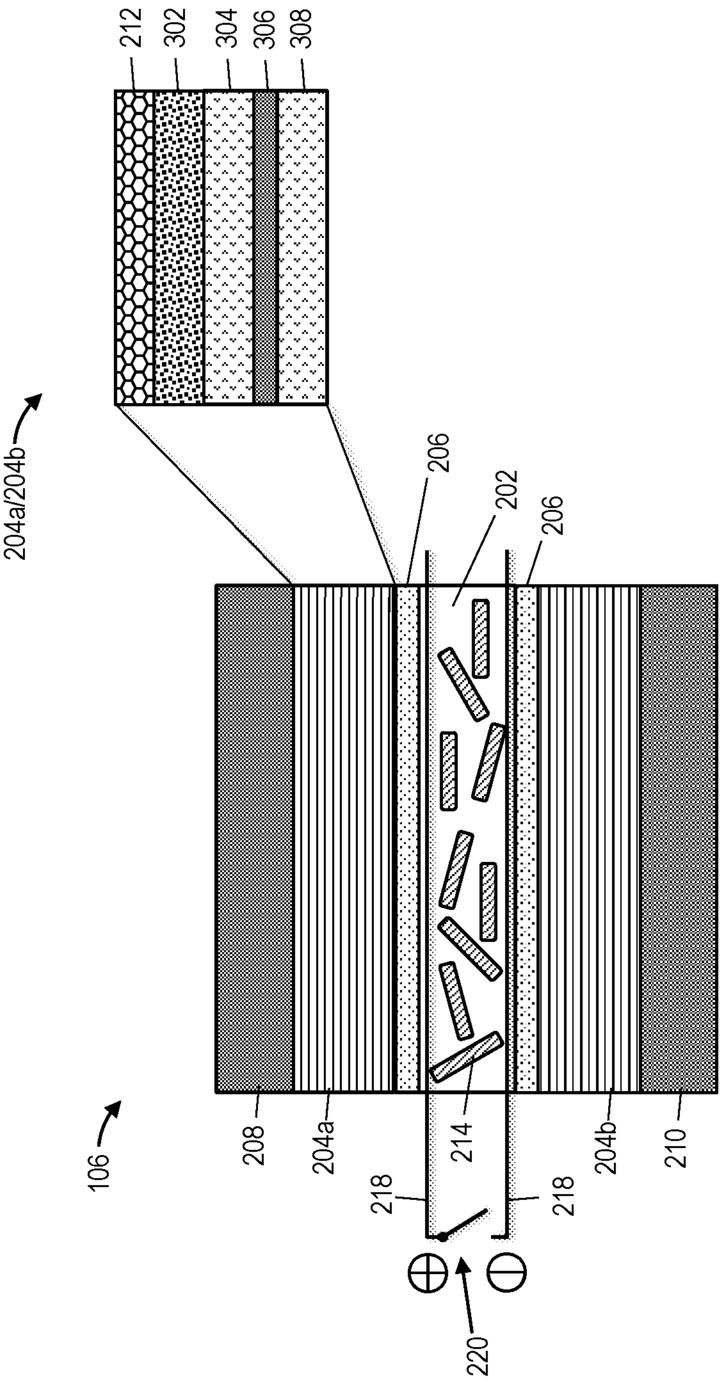
FIG. 3 is a cross-sectional view of the variable transmittance laminate shown in FIGS. 2A and 2B in accordance with one or more embodiments.

FIG. 3 illustrates a cross-sectional view of the variable transmittance laminate 106 shown in FIGS. 2A and 2B in accordance with one or more embodiments. FIG. 3 further illustrates a detailed view of the thermally conductive multi-layers 204*a* and 204*b*.

In some embodiments, the thermally conductive multi-layers 204*a* and 204*b* can include a thermal conductive layer 302, a first interphase polymer layer 304, a polymer layer 306, and a second interphase polymer layer 308. In some embodiments, the thermal conductive layer includes a graphene layer (k~3000 W/m-K), a single layer hexagonal boron nitride (h-BN) (k~550 W/m-K), $Al_2O_3$ (k~10 W/m-K), sapphire (k~1000 W/m-K), and/or indium tin oxide (k~2 W/m-K), although other materials are within the contemplated scope of this disclosure.

In some embodiments, the first interphase polymer layer 304 includes a first polymer and a second polymer. In some embodiments, the first polymer is made of a same material as the inner lens layer 208 and/or the outer lens layer 210. In some embodiments, the second polymer is made of a same material as the polymer layer 306.

The polymer layer 306 can be made from any suitable transparent polymers for overmolding. For example, in some embodiments, the polymer layer 306 is made of benzoxazine, BMI, a cyanate ester, an epoxy, PF, a polyacrylate (acrylic), PI, an unsaturated polyester, PUR, a vinyl ester, a siloxane, co-transparent layers thereof, and combinations thereof. In certain aspects, the polymer layer 306 can include a thermoplastic transparent layer selected from the group consisting of: PEI, PAI, PA, PEEK, PEK, PVC, PPS, TPU, PP, PC/ABS, HDPE, PET, PMMA, SMMA, MABS, PC, PAEK, co-transparent layers thereof, and combinations thereof. In some embodiments, the polymer layer 306 is made of a different transparent polymers than the inner lens layer 208 and/or the outer lens layer 210.

In some embodiments, the second interphase polymer layer 308 includes the second polymer and a transition material of a same type as the auto-shading film 202, such as, for example, PDLC film, EC, and $WO_3$ based film.

In some embodiments, the thermal conductive layer 302, the first interphase polymer layer 304, the polymer layer 306, and the second interphase polymer layer 308 of the thermally conductive multi-layers 204*a* and 204*b*, the auto-shading film 202, the inner lens layer 208, and the outer lens layer 210 are laminated together using an overmolding process.

In some embodiments, the thermal conductive layer 302, the first interphase polymer layer 304, the polymer layer 306, and the second interphase polymer layer 308 of the thermally conductive multi-layers 204*a* and 204*b*, the auto-shading film 202, the inner lens layer 208, and the outer lens layer 210 are heat-sealed under pressure to laminate the final structure (i.e., the variable transmittance laminate 106). In some embodiments, the structural composite 212 is embedded within the thermally conductive multi-layers 204*a* and/or 204*b* prior to the lamination process (as shown).

In some embodiments, lamination involves heating (e.g., at temperatures greater than 150 degrees Celsius, such as 200, 250, 300, 350 Celsius) and quenching in an autoclave under a pressure of 10 kg-f/cm$^2$ or higher, although other lamination conditions (temperatures, pressures, etc.) are within the contemplated scope of this disclosure. In some embodiments, the variable transmittance laminate 106 can be formed to a total post-lamination thickness of 0.1 mm to 10 mm or greater (e.g., 0.3 mm, 0.7 mm, 2 mm, an inch, several inches, etc.), depending on the application and design targets.

In some embodiments, the auto-shading film 202 requires protection as the film contains materials that will degrade after exposure to temperatures above 150 Celsius. In some embodiments, the thermally conductive multi-layers 204*a* and 204*b* shift a peak temperature out of the auto-shading film 202 during the overmolding (lamination) process.

Figure 4:
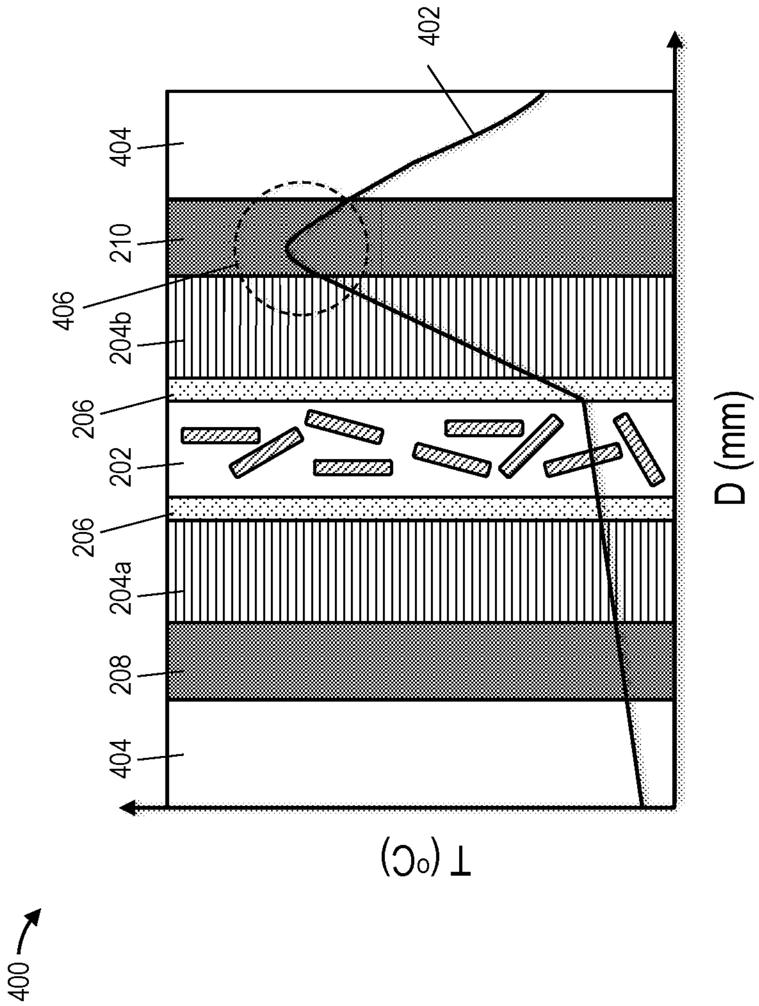
FIG. 4 is a graph of an example temperature curve through portions of a variable transmittance laminate during an overmolding process in accordance with one or more embodiments.

FIG. 4 illustrates a graph 400 of an example temperature curve 402 through portions of the variable transmittance laminate 106 during an overmolding process in accordance with one or more embodiments. As shown in FIG. 4, temperature (Y-axis) varies as a function of depth (X-axis) through the variable transmittance laminate 106 when placed within opposite sidewalls of a mold 404.

As further shown in FIG. 4, a peak temperature 406 along the temperature curve 402 has been shifted out of the auto-shading film 202 due to the thermal effects of the thermally conductive multi-layers 204*a* and 204*b*. As discussed previously, prior laminates without the thermally conductive multi-layers 204*a* and 204*b* are prone to thermal degradation as the peak temperature 406 will occur within the auto-shading film 202. In other words, the thermally conductive multi-layers 204*a* and 204*b* reduce thermal load within the auto-shading film 202 during the lamination process. The particular degree of shift in the peak temperature 406 and the respective value of the peak temperature 406 will vary depending on material selection, layer thicknesses, etc., for a given application.

Observe that, in the case of injection molding with a thermoplastic polymer, the melt temperature of the inner lens layer 208 and the outer lens layer 210 (i.e., the polymer melt temperature) is a property inherent to the polymer itself. Furthermore, for polymers like polycarbonate the clarity of the polymer is dictated by the temperatures selected in molding, with higher mold temperatures (of the mold 404 itself, not necessarily the melt temperature of the polymer) correlated to improved clarity of the resulting component. In some embodiments, such as when a thermoset material is selected, the overmolding pressures and temperatures may be controlled through chemistry selection and the molding time/temperature may be further altered such that molding times are increased and molding temperatures are decreased to achieve a desired balance of time/temperature while achieving a sufficient degree of cure for the thermoset system. These molding methods can include resin infusion, resin transfer molding (RTM), high pressure resin transfer molding (HP-RTM), liquid compression molding, and vacuum bagging.

Thermoplastics (e.g., PC) and thermoset resins (e.g., epoxy) include bisphenol-A, which is susceptible to UV degradation. Degradation is commonly observed through yellowing and increased haze in the transparent material. In some embodiments, a protective layer (not separately shown), such as PMMA, can be applied to materials with known UV degradation pathways to improve overall UV resistance. Additionally, or alternatively, resins like PC can exhibit poor scratch resistance. In some embodiments, the inner lens layer 208 and/or the outer lens layer 210 are coated with a scratch resistance coating such as a silicone hardcoat (e.g., polysiloxane) to improve scratch resistance. Scratch resistance coatings and UV protective layers can be combined in a single layer or in a multi-layer stack. In some embodiments, a primer layer (e.g., acrylic coating, not separately shown) can be applied to the surface of the PC prior to the application of the silicone hardcoat. In some embodiments, such as when additional scratch resistance is needed or desired, a vapor deposition of a relatively thin (less than 2 mm) additional scratch resistant layer can be applied to the surface of the PC or the silicone hard coated PC. In some embodiments, UV absorbers are added into the setting resin (such as PC), the primer layer, and/or the hardcoat.

Figure 5:
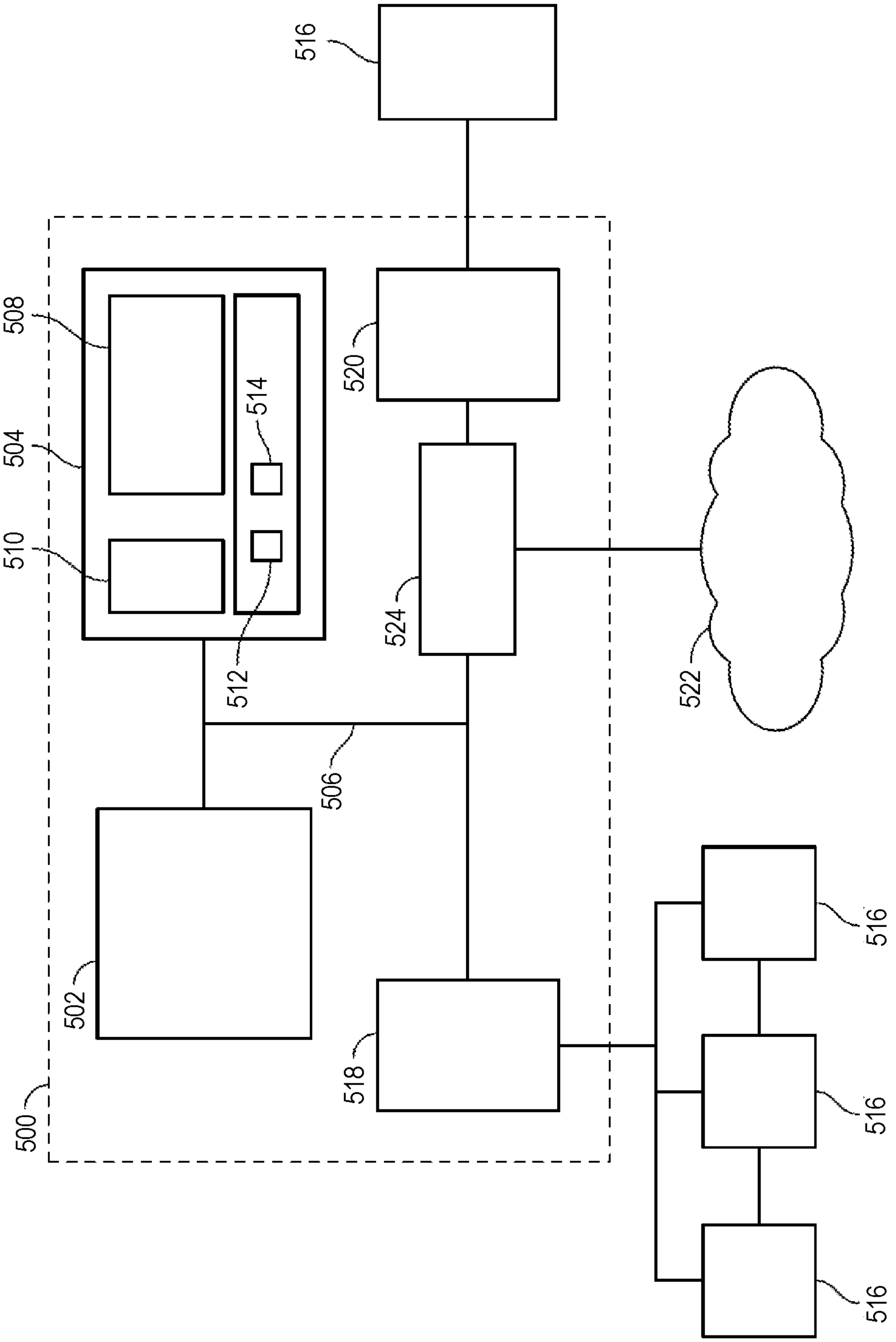
FIG. 5. is a computer system according to one or more embodiments.

FIG. 5 illustrates aspects of an embodiment of a computer system 500 that can perform various aspects of embodiments described herein. In some embodiments, the computer system 500 can be incorporated within or in combination with a controller (e.g., controller 216). The computer system 500 includes at least one processing device 502, which generally includes one or more processors for performing a variety of functions, such as, for example, controlling switching and/or driving voltages to the switch 220 and/or the wires 218. More specifically, the computer system 500 can include the logic necessary to adjust the transmittance of the auto-shading film 202 via application of an electric current as described previously herein.

Components of the computer system 500 include the processing device 502 (such as one or more processors or processing units), a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media.

For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to control of the switch 220, the value of an applied voltage and/or current, etc. The computer system 500 is not so limited, as other modules may be included depending on the desired functionality of the respective displays. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 502 can also be configured to communicate with one or more external devices 516 such as, for example, a keyboard, a pointing device, and/or any devices (e.g., a network card, a modem, vehicle ECUs, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc. In some embodiments, the computer system 500 and/or the processing device 502 can receive information from one or more micro sensors (e.g., the sensor units 302), analyze said information, and send the information (raw, pre-processed, and/or post-processed) to one or more LEDs (e.g., the micro LEDs 210) and/or any other component of the vehicle 100.

Figure 6:
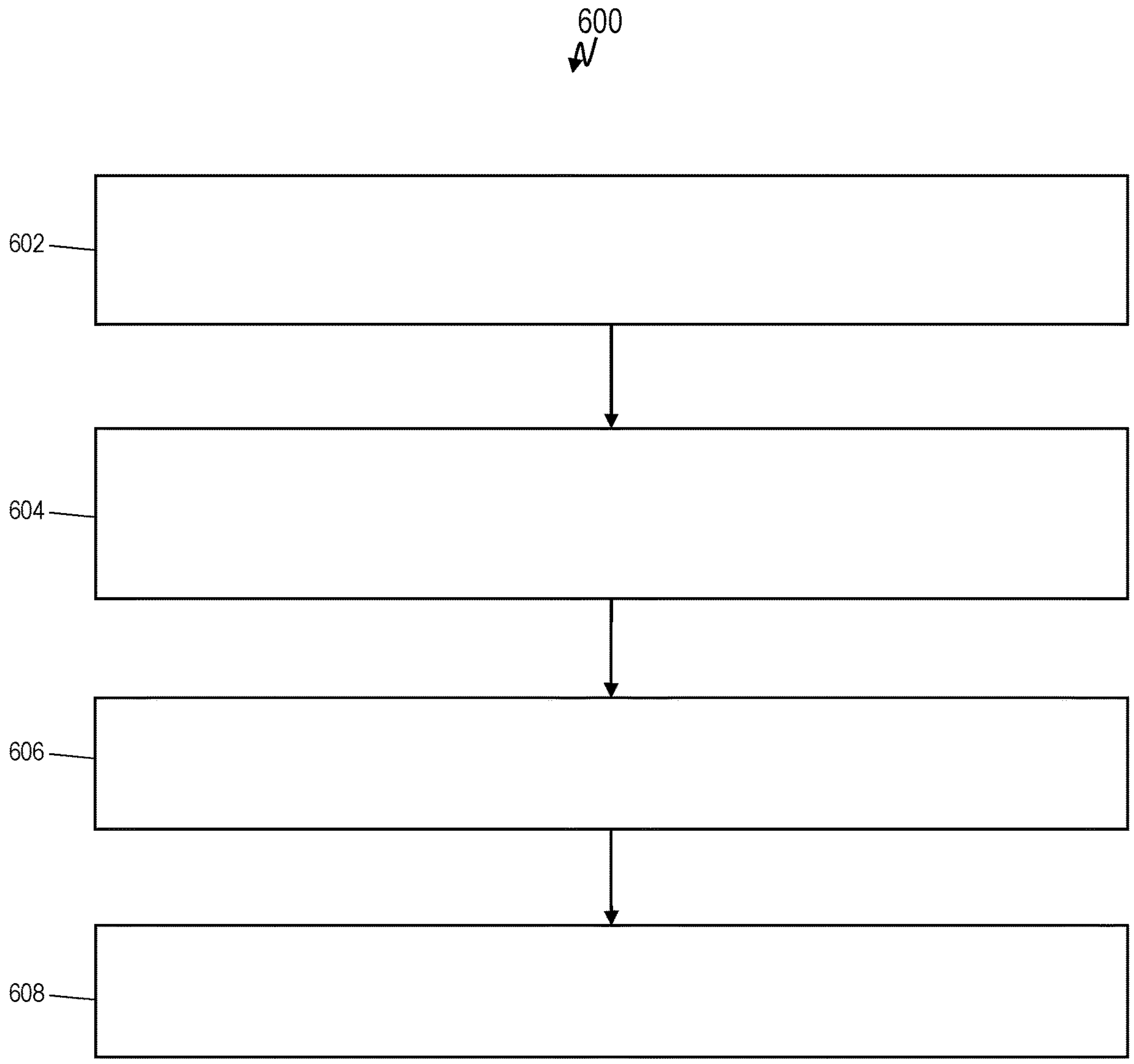
FIG. 6 is a flowchart in accordance with one or more embodiments.

Referring now to FIG. 6, a flowchart 600 for forming a variable transmittance laminate having an embedded thermally conductive multi-layer for auto-shading applications is generally shown according to an embodiment. The flowchart 600 is described in reference to FIGS. 1 to 5 and may include additional steps not depicted in FIG. 6. Although depicted in a particular order, the blocks depicted in FIG. 6 can be rearranged, subdivided, and/or combined.

At block 602, the method includes forming a thermally conductive multi-layer.

At block 604, the method includes forming an auto-shading film on the thermally conductive multi-layer. In some embodiments, the auto-shading film includes discrete substructures which vary in alignment in response to an electric field.

At block 606, the method includes forming an outer lens layer.

At block 608, the method includes forming an inner lens layer.

In some embodiments, the method includes forming a structural composite embedded within the thermally conductive multi-layer. In some embodiments, the method includes forming a moisture barrier coating layer between the auto-shading film and the thermally conductive multi-layer.

In some embodiments, the thermally conductive multi-layer includes a thermal conductive layer. In some embodiments, the thermal conductive layer includes a material that shifts a peak temperature during an overmolding process for forming the variable transmittance laminate out of the auto-shading film.

In some embodiments, the thermal conductive layer includes at least one of a graphene layer, a single layer hexagonal boron nitride, aluminum oxide, sapphire, indium tin oxide, carbon black, and metal foil. In some embodiments, the thermally conductive multi-layer further includes a first interphase polymer layer, a polymer layer, and a second interphase polymer layer. In some embodiments, the first interphase polymer layer includes a first polymer and a second polymer. In some embodiments, the first polymer includes a same material as at least one of the inner lens layer and the outer lens layer. In some embodiments, the second polymer includes a same material as the polymer layer.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

a lighting system comprising a light source and a housing for the light source;

a variable transmittance laminate positioned such that light emitted from the housing passes through the variable transmittance laminate, the variable transmittance laminate comprising:

a thermally conductive multi-layer;

an auto-shading film directly on the thermally conductive multi-layer, the auto-shading film comprising discrete substructures which vary in alignment in response to an electric field;

an outer lens layer; and an inner lens layer;

a wire embedded in the auto-shading film; and a controller electrically coupled to the wire, the controller configured to direct a switching voltage to a switch to change a state of the switch, thereby causing the wire to deliver the electric field to the discrete substructures;

wherein the variable transmittance laminate comprises a first transmittance when the switch is in a first state and a second transmittance greater than the first transmittance when the switch is in a second state; and characterized in that the thermally conductive multi-layer comprises a thermal conductive layer of a predetermined material comprising at least one of a graphene layer, a single layer hexagonal boron nitride, sapphire, indium tin oxide, carbon black, and metal foil, and having a thickness between 0.5 and 5.0 mm selected for the predetermined material to shift a peak temperature during an overmolding process for forming the variable transmittance laminate out of the auto-shading film and into one of the thermally conductive multi-layer, the outer lens, and the inner lens.

2. The vehicle of claim 1, further comprising a structural composite embedded within the thermally conductive multi-layer.

3. The vehicle of claim 1, wherein the thermally conductive multi-layer further comprises a first interphase polymer layer, a polymer layer, and a second interphase polymer layer.

4. The vehicle of claim 3, wherein the first interphase polymer layer comprises a first polymer and a second polymer, the first polymer comprising a same material as at least one of the inner lens layer and the outer lens layer, the second polymer comprising a same material as the polymer layer.

5. A variable transmittance laminate comprising:

a thermally conductive multi-layer;

an auto-shading film directly on the thermally conductive multi-layer, the auto- shading film comprising discrete substructures which vary in alignment in response to an electric field;

an outer lens layer; and an inner lens layer;

characterized in that the thermally conductive multi-layer comprises a thermal conductive layer of a predetermined material comprising at least one of a graphene layer, a single layer hexagonal boron nitride, sapphire, indium tin oxide, carbon black, and metal foil, and having a thickness between 0.5 and 5.0 mm selected for the predetermined material to shift a peak temperature during an overmolding process for forming the variable transmittance laminate out of the auto-shading film and into one of the thermally conductive multi-layer, the outer lens, and the inner lens.

6. The variable transmittance laminate of claim 5, further comprising a structural composite embedded within the thermally conductive multi-layer.

7. The variable transmittance laminate of claim 5, wherein the thermally conductive multi-layer further comprises a first interphase polymer layer, a polymer layer, and a second interphase polymer layer.

8. The variable transmittance laminate of claim 7, wherein the first interphase polymer layer comprises a first polymer and a second polymer, the first polymer comprising a same material as at least one of the inner lens layer and the outer lens layer, the second polymer comprising a same material as the polymer layer.

9. A method comprising:

forming a thermally conductive multi-layer;

forming an auto-shading film directly on the thermally conductive multi-layer, the auto-shading film comprising discrete substructures which vary in alignment in response to an electric field;

forming an outer lens layer; and forming an inner lens layer;

characterized in that the thermally conductive multi-layer comprises a thermal conductive layer of a predetermined material comprising at least one of a graphene layer, a single layer hexagonal boron nitride, sapphire, indium tin oxide, carbon black, and metal foil, and having a thickness between 0.5 and 5.0 mm selected for the predetermined material to shift a peak temperature during an overmolding process for forming the variable transmittance laminate out of the auto-shading film and into one of the thermally conductive multi-layer, the outer lens, and the inner lens.

10. The method of claim 9, further comprising forming a structural composite embedded within the thermally conductive multi-layer.

11. The method of claim 9, wherein the thermally conductive multi-layer further comprises a first interphase polymer layer, a polymer layer, and a second interphase polymer layer.

12. The vehicle of claim 1, wherein the thermally conductive multi-layer comprises a transparency of greater than 90 percent.

13. The vehicle of claim 1, wherein the thermally conductive multi-layer comprises carbon black.

14. The vehicle of claim 1, wherein the thermally conductive multi-layer comprises metal foil.

15. The variable transmittance laminate of claim 5, wherein the thermally conductive multi-layer comprises a transparency of greater than 90 percent.

16. The variable transmittance laminate of claim 5, wherein the thermally conductive multi-layer comprises carbon black.

17. The variable transmittance laminate of claim 5, wherein the thermally conductive multi-layer comprises metal foil.

18. The method of claim 9, wherein the thermally conductive multi-layer comprises a transparency of greater than 90 percent.

19. The method of claim 9, wherein the thermally conductive multi-layer comprises carbon black.

20. The method of claim 9, wherein the thermally conductive multi-layer comprises metal foil.

* * * * *